Patented Feb. 9, 1937

2,070,521

UNITED STATES PATENT OFFICE 2,070,521

ANTIOXIDANT

William C. Calvert, Cuyahoga Falls, Ohio, assignor to Wingfoot Corporation, Wilmington, Del., a corporation of Delaware No Drawing. Application July 13, 1933
Serial No. 680,256

4 Claims. (Cl. 18—50)

This invention relates to a new class of age resisting compounds suitable for incorporation as antioxidants in rubber and other deteriorable compositions. The substances comprising the class in question have been found by numerous tests to protect rubber against deterioration from such influences as heat, light and oxygen. They have also been found to materially enhance the resistance of rubber to deterioration by flexing. In addition they impart other desirable properties such as improved tensile strength to the vulcanized product.

Substances which may be employed as antioxidants in accordance with the teachings of the invention are tertiary dialkyl naphthylamines of the following type formula:

R being a naphthyl group, substituted or unsubstituted, and $R_1$ and $R_2$, aliphatic hydrocarbon groups, at least one of which contains at least two carbon atoms. Falling within the scope of the invention are diethyl alpha or beta naphthylamine, di iso propyl alpha or beta naphthylamine, di amyl alpha or beta naphthylamine, dibutyl naphthylamine, ethyl methyl alpha naphthylamine, ethyl butyl alpha naphthylamine, di heptyl alpha naphthylamine, ethyl propyl naphthylamine, dibutyl alpha hydroxy beta naphthylamine, dibutyl alpha amino beta naphthylamine, and propyl butyl beta naphthylamine. Any of these compounds, either alone or in admixture with others of the class, may be incorporated in rubber as antioxidants to excellent advantage.

The antioxidants described may be prepared according to any of the well-known chemical processes, for instance, they may be prepared by reacting a primary aromatic amine with an alkyl halide. Dibutyl alpha naphthylamine, for instance, may be prepared by reacting butyl bromide and alpha naphthylamine in the presence of sodium carbonate. Other possible methods of preparation include the reacting of a dialkyl sulfate with a primary aromatic amine, an alkyl ester of toluene sulfonic acid with a primary aromatic amine and an aryl amine with a secondary dialkyl amine. It is to be understood that the invention is not limited to any specific method of preparing the antioxidants.

These materials may be employed advantageously in substantially any of the standard rubber formulae, the following being one in which they have been found to give excellent results.

|  | Parts |
|---|---|
| Extracted pale crepe | 100 |
| Zinc oxide | 5 |
| Sulfur | 3 |
| Hexamethylene tetramine | 1 |
| Stearic acid | 1.5 |
| Antioxidant | 1 |

Samples prepared in accordance with the foregoing formula were subjected to vulcanization for varying periods of time and then tested to ascertain their physical characteristics. One set from each type of stock was tested immediately for tensile strength and elasticity while a second set was subjected to ageing in a Bierer-Davis bomb for 6 days in oxygen at 50 degrees C. and 150 pounds per square inch pressure. At the conclusion of the six day period the samples were removed from the bomb and subjected to physical tests corresponding to those conducted upon the unaged samples.

It is evident from the following tables that rubber compositions containing even small proportions of the antioxidants of this invention resist deterioration remarkably well. Similar compositions not containing the antioxidants, on being subjected to corresponding tests, increase in weight in the neighborhood of 10% and lose almost all their tensile and elongation properties.

| | Original | | | | 6 days at 50° C. and 150£/in.² | | | | |
|---|---|---|---|---|---|---|---|---|---|
| Cure in min/° F. | Tens. kg/cm² | Elong. in % | Stress kg/cm² | | Aged in oxygen bomb | | | | |
| | | | 500% | 700% | Tens. kg/cm² | Elong. in % | 500% | 700% | % wt. inc. |
| Dibutyl alpha naphthylamine | | | | | | | | | |
| 35/285 | 96 | 935 | 12 | 25 | 100 | 875 | 11 | 35 | .02 |
| 50 | 127 | 855 | 16 | 50 | 115 | 800 | 17 | 60 | .08 |
| 70 | 142 | 815 | 20 | 70 | 144 | 780 | 21 | 87 | .08 |

From the foregoing it is apparent that the compounds herein disclosed are highly suitable for antioxidants of rubber and other products which undergo deterioration under the influences of heat, light and oxygen. Not only do these compounds counteract the effects of such influences but they tend to impart other highly desirable qualities, such for example as increased resistance to deterioration by flexing.

It will be apparent that numerous changes may be made in the procedure to be followed and the chemicals employed without departing from the inventive concept. It is intended that the patent shall cover, by suitable expression in the appended claims, whatever features of patentable novelty reside in the invention.

What I claim is:

1. A rubber product that has been vulcanized in the presence of N-dibutyl alpha naphthylamine.

2. A method of preserving rubber which comprises subjecting it to vulcanization in the presence of N-dibutyl alpha naphthylamine.

3. A method of preserving rubber which comprises treating the same with an N-dibutyl naphthylamine.

4. An age-resisting rubber product comprising rubber and an N-dibutyl naphthylamine.

WILLIAM C. CALVERT.